Patented July 11, 1933

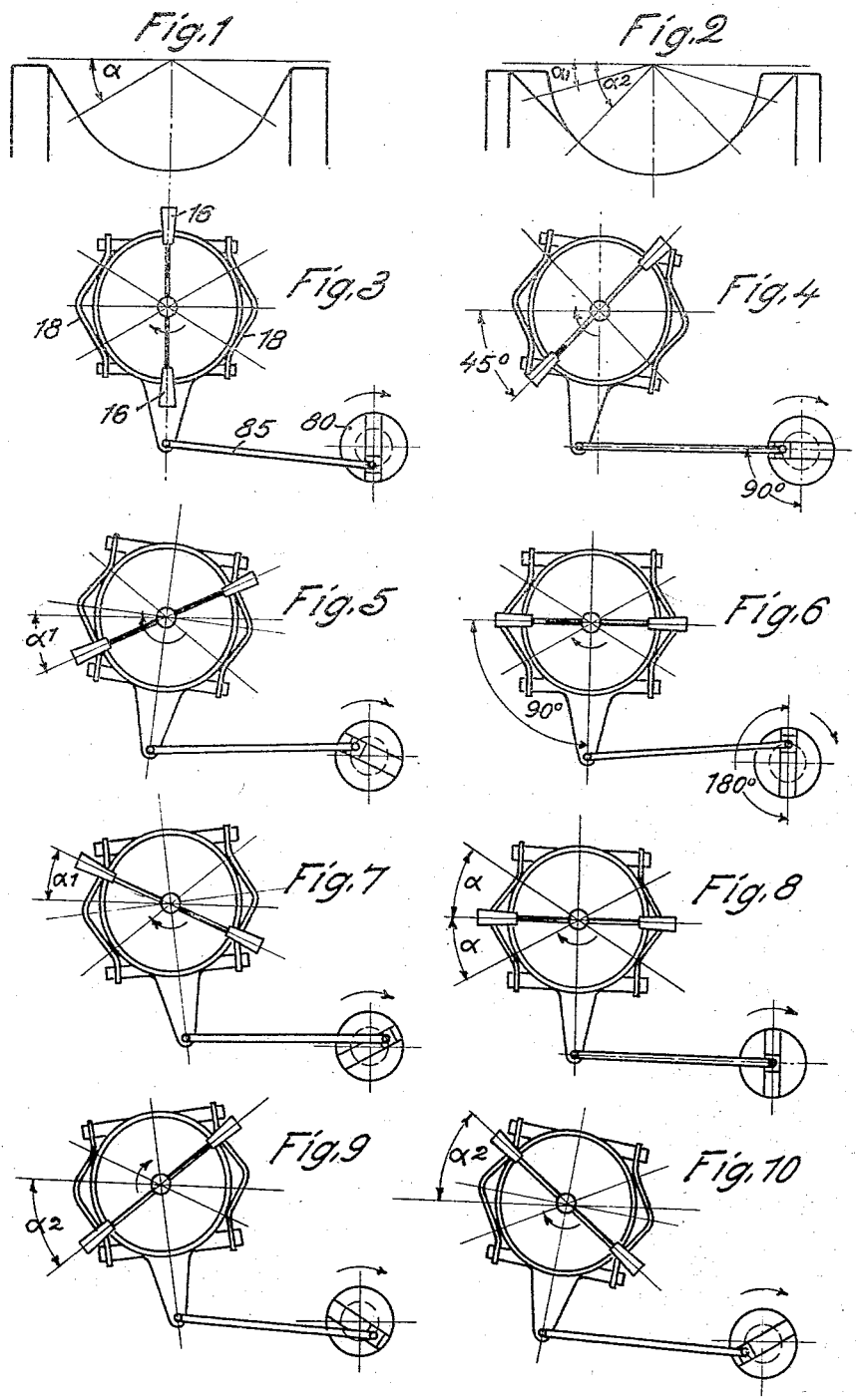

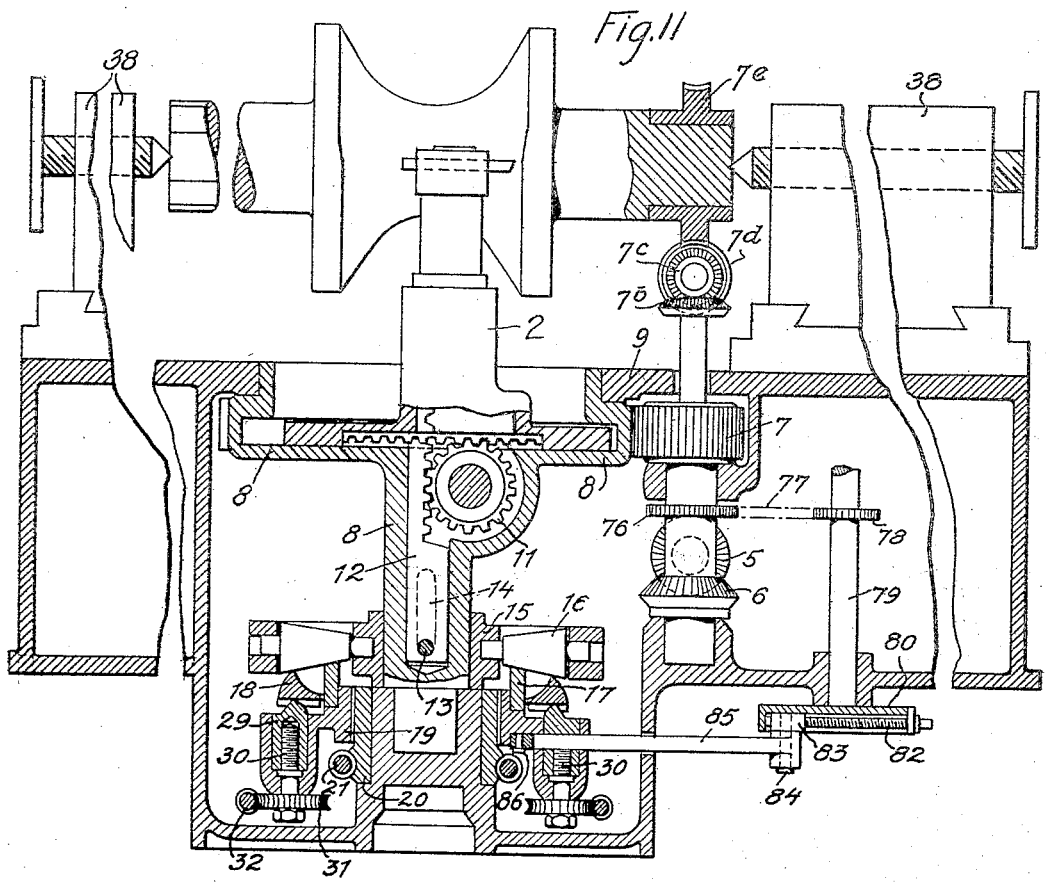

1,918,138

UNITED STATES PATENT OFFICE

HANS SCHIMMEL, OF KOMOTAU, CZECHOSLOVAKIA

APPARATUS FOR MACHINING ROLLS FOR ROLLING MILLS AND THE LIKE

Application filed December 7, 1931, Serial No. 579,615, and in Germany December 24, 1930.

This invention is for an improvement in or modification of the apparatus for machining rolls for rolling mills and the like.

My older specification No. 514,620 describes apparatus for machining circumferential grooves in Pilger and like rolls in which a tool holder is arranged to extend between a pair of rolls mounted on the machine and is subjected to periodical radial displacement as the tool holder rotates whilst effecting cuts across the peripheral faces of the rolls. The radial displacements of the tool holder are arranged to effect in conjunction with the rotational movement thereof, a cutting of the inclined side portions of the grooves in the rolls. In the construction of apparatus described in the older specification, the radial displacements are effected through the medium of cams operatively connected to the holder and the point during the travel of the tool at which the radial displacement of the tool holder commences is predetermined by the particular construction of cams employed.

According to this invention means are provided whereby the radial displacements of the tool holder may be effected during any desired angular displacement of the rotation thereof.

The invention is preferably carried into effect by arranging the cams controlling the radial displacements of the tool holder so as to be movable and thus to vary the points at which the cams come into effective operation to produce the displacements of the tool holder, thus enabling the grooves in the rolls to be machined with inclined side portions which subtend any desired angle with respect to the point from which the circular, central portion of the groove is generated.

In order that the invention may be fully understood, reference is directed to the accompanying drawings, in which:—

Figures 1 and 2 are diagrammatic representations of the cross-section of a groove in a Pilger roll and are hereinafter referred to, Figures 3 to 10 illustrate diagrammatically a portion of the mechanism of an apparatus constructed in accordance with this invention and indicate respectively the parts thereof in various positions hereinafter described.

Figure 11 is a vertical section through a portion of an apparatus constructed in accordance with the older specification and modified in accordance with this invention, and Figure 12 is a sectional plan of part of the apparatus illustrated in Figure 11.

Referring to Figure 1, the angle $\alpha$ represents the angle of rotation of the tool holder during which it is displaced radially in one direction with respect to its axis of rotation in accordance with the older specification, whilst the tool therein effects a cut along one of the inclined portions of a groove in the roll. In Figure 2 the angles $\alpha^1$ and $\alpha^2$ represent examples of various angles in which the radial displacement of the tool holder may be effected according to this invention.

Referring to Figure 3, a pair of rollers 16 are illustrated which are operatively connected to the tool holder (not shown) so as to rotate therewith and are arranged to cooperate with segmental cams 18 to effect radial displacement of the tool holder in the manner described in the older specification. The angle of rotation of the tool holder during which the same is radially displaced is determined by the point at which the rollers 16 engage with the cams 18 and the point at which the rollers 16 leave the said cams. When the rollers 16 are out of engagement with the cams 18 they are arranged to be supported upon a ring member in the manner described in the older specification. In the construction according to the older application the cams 18 are fixed relatively to the axis of the tool holder so that a particular pair of cams will always effect radial displacements of the tool holder corresponding to particular angles of rotation thereof.

In the construction according to the present invention the cams 18 are constructed so as to be rotatable in both directions about the axis of the tool holder. The rotational movements of the cams 18 are effected by the said cams being mounted upon a rotatable holder operatively connected by a link 85 to a crank disc 80. The link 85 is connected to a slide block arranged in a diametrically disposed guide slot formed in the crank disc 80, the slide block being adjustable in the said guide slot.

Figure 3 represents the central position of the parts illustrated therein, whilst Figure 4 represents the position of the parts after the tool holder has made a clockwise rotation through an angle of 45° and, as the crank disc 80 is arranged to rotate at twice the speed of the tool holder, the said disc has rotated through an angle of 90°. This operation has moved the cams 18 in advance of the rollers 16 so that in the position indicated in Figure 4, the said rollers are still out of contact with the cams 18. In Figure 5, the parts are illustrated in a position in which the crank 80 has commenced to return the cams 18 towards their central position and the rollers 16 have moved into contact with the said cams, so that the radial displacement of the tool holder is commenced and is continued in one direction until the tool holder has rotated through an angle of 90° from the position indicated in Figure 3 and the crank 80 has rotated through an angle of 180°. Thus, the radial displacement of the tool holder has been effected during the rotation thereof through the angle $\alpha^1$ as indicated in Figures 2 and 5 which is a smaller angle than would have been the case if the cams 18 had been stationary. The position of the cams 18 after the rotation of the tool holder through an angle of 90° is again central as indicated in Figure 6. Continued rotation of the tool holder and crank disc 80 causes the cams 18 to be rotated in the opposite direction to the tool holder and during which movements radial displacement of the tool holder in the opposite direction to that above described is effected, whilst the tool holder rotates through a further angle of $\alpha^1$. The rollers 16 then leave the cams 18, this position being indicated in Figure 7.

If the slide block to which the link 85 is connected is adjusted to the central position of the crank disc 80 no movement of the cams 18 about the axis of rotation of the tool holder is effected and thus radial displacements of the tool holder are effected during angles of rotation thereof corresponding to $\alpha$ as indicated in Figure 8.

If the slide block is adjusted to the opposite end of the slot in the crank disc 80 to that indicated in Figure 3 radial displacements of the tool holder are effected during an angle of rotation thereof which is greater than $\alpha$ and may be effected, for example, during maximum angles of rotation of the tool holder represented by the angle $\alpha^2$, Figure 2. Figure 9 illustrates the position of the parts during rotation of the tool holder in which the rollers 16 engage with the cams 18 and Figure 10 illustrates the position of the parts when the said rollers leave the said cams.

It will be appreciated that adjustments of the slide block in the guide slot of the crank disc 80 may be made to effect radial displacements of the tool holder during angles of rotation thereof varying between $\alpha^1$ and $\alpha^2$.

Referring to Figures 11 and 12, a construction of apparatus in accordance with this invention is illustrated in which the above described crank disc 80 is secured to one end of a spindle 79 which is operatively connected by chain and chain wheels 76, 77, and 78 to the driving spindle of a pinion 7 arranged to rotate a hollow arbour 8 upon the upper portion of which the tool holder 2 is mounted in the manner described in the older specification.

The radial movement of the tool holder 2 is effected during the rotary movements of the arbour 8 by a horizontally toothed rack 10 secured to the tool holder 2, a toothed wheel 11 arranged in mesh therewith and with a further rack 12 constituting a driving rod for said mechanism.

The actuation of the rack 12 is effected by means of rising and falling movements of a pin 13 secured to said rack and the ends of which extend through diametrically opposed slots 14 formed in the arbour 8, the said ends being secured to a cage 15 arranged to surround said arbour and vertically slidable thereon.

The roll or rolls to be machined are supported on headstocks 38, movable perpendicularly to their axis corresponding to the different diameters of the rolls to be worked. On an extension of the shaft $7a$ is a bevel wheel $7b$ meshing with a bevel wheel $7c$ on a worm $7d$ meshing with a worm wheel $7e$ placed on the roll pin. This mechanism gives the roll a feeding movement.

The spindle of the pinion 7 is arranged to be rotated through the medium of bevel wheels 5 and 6. The transmission ratio to the spindle 79 is arranged so that the crank disc 80 rotates at twice the speed of the arbour 8. The crank disc 80 has a diametrically disposed slot 81 formed therein in which a slide block 83 is arranged to slide and in which the said block may be adjusted by means of a screw-threaded spindle 82 arranged in engagement therewith. A stud 84 is provided on the slide block 83 to which one end of a link 85, is pivotally connected, the other end of which is connected by means of a pin 86 to a holder 19 rotatably mounted co-axially with the arbour 8. The holder 19 is arranged to carry a pair of segmental cams 18 and also the ring member 17, upon which the rollers 16, hereinbefore described, are arranged to roll when out of contact with the cams 18.

In the older specification means are described for raising and lowering the cams 18 relatively to the holder 19 and this is effected through the medium of worm and worm wheel mechanism 32, 31 arranged to be driven through the medium of bevel wheels 33, 34, 35, 36 operatively connected to a spindle 37 which is driven in synchronism with the rest of the machine. In order to permit the movements of the holder 19 about the axis of the arbour 8, the driving connection between the bevel wheel 36 and the spindle 37 is effected through the medium of universal joints 87 and a splined sleeve 80 arranged telescopically at 88 with respect to spindles operatively connected to the universal joints 87.

I claim:—

1. In an apparatus for machining the circumferential portions of rolls of the type described the combination of means for supporting at least one roll to be machined, a tool holder rotatable about an axis disposed transversely to the axis of a roll located in said supporting means, means for rotating said tool holder for cutting, means for rotating said at least one roll for feeding the same to said cutting, means operable to move said tool holder radially with respect to the axis of rotation thereof as said tool holder rotates, and mechanism operable to control the effective operation of said moving means whereby said radial movements of said tool holder can be effected during any selected angle of rotation thereof.

2. In an apparatus for machining the circumferential portions of rolls of the type described, the combination of means for supporting a pair of rolls to be machined with their axes disposed parallel to one another, a tool holder located between a pair of rolls so supported, means for rotating said tool holder for cutting about an axis disposed transversely to the axis of said rolls, means for rotating said rolls for feeding the same to said cutting, means operable to move said tool holder radially with respect to the axis of rotation thereof as the same rotates, and mechanism operable to control the effective operation of said moving means whereby said radial movements of said tool holder can be effected during any selected angle of rotation thereof.

3. In an apparatus for machining the circumferential portions of rolls of the type described, the combination of means for supporting at least one roll to be machined, a hollow arbour rotatable about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, a pin carried by said second rack and extending through diametrically opposed slots formed axially in said arbour, a cage arranged around said arbour and slidable axially thereon, means for rotating said cage with said arbour, an operative connection between said pin and said cage, at least one cam arranged to control said cage as the same rotates to move the same axially with respect to said arbour and thereby effect said radial movement of said tool holder as the same rotates, and means operatively connected to said cam operable to move the same in both directions about the axis of said arbour as the arbour rotates, for the purpose described.

4. In an apparatus for machining the circumferential portion of rolls of the type described, the combination of means for supporting at least one roll to be machined, a hollow arbour rotatably mounted about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, a pin carried by said second rack and extending through diametrically opposed slots formed therein, a cage surrounding said arbour and slidable axially thereon, means for rotating said cage with said arbour, an operative connection between said pin and said cage, a ring member arranged to surround said arbour and at least a pair of cams diametrically disposed with respect to said arbour, said ring and said cams being operable to engage with said cage and operable to effect movement thereof in at least one direction axially of said arbour as the same rotates and thereby effect said radial movement of said tool holder as the same rotates and means operatively connected to said cam operable to move the same in both directions about the axis of said arbour as the arbour rotates, for the purpose described.

5. In an apparatus for machining the circumferential portions of rolls of the type described, the combination of means for supporting at least one roll to be machined, a hollow arbour rotatable about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, an operative connection between said second rack and a cage arranged around said arbour and slidable thereon, means for rotating said cage with said arbour, a ring member arranged to surround said arbour and at least a pair of cams diametrically disposed with respect to said arbour, said ring and said cams being operable to engage with said cage and effect movement thereof in one direction axially of said arbour, means operable to effect movement of said cage in the other direction, and means operatively connected to said cams operable to move the same in both directions about the axis of said arbour as the arbour rotates, for the purpose described.

6. In an apparatus for machining the circumferential portions of rolls of the type described, the combination of means for supporting at least one roll to be machined, a hollow arbour rotatably mounted about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, an operative connection between said second rack and a cage surrounding said arbour and slidable thereon, means for rotating said cage with said arbour, a ring member arranged to surround said arbour and at least a pair of cams diametrically disposed with respect to said arbour, said ring and said cams being operable to engage with said cage and effect movement thereof in one direction axially of said arbour as the same rotates, means operable to effect movement of said cage in the other direction for the purpose specified, means operatively connected to said cams operable to move the same in both directions about the axis of said arbour as the arbour rotates, and means operatively connected to said ring and means operatively connected to said cams operable to move said ring and said cams relatively to said arbour in an axial direction thereof.

7. In an apparatus for machining the circumferential portions of rolls of the type described, the combination of means for supporting at least one roll to be machined, a hollow arbour rotatable about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, a pin carried by said second rack and extending through diametrically opposed slots formed axially therein, a cage arranged exteriorly of said arbour and movable axially thereof, means for rotating said cage with said arbour, an operative connection between said pin and said cage, a ring member arranged to surround said arbour and at least a pair of cams diametrically disposed with respect to said arbour, said ring and said cams being operable to engage with said cage and effect movement thereof in one direction axially of said arbour as the same rotates, means operable to effect movement of said cage in the other direction, a support for the said ring and said cams, means operatively connected to said support operable to move the same in both directions about the axis of said arbour as the arbour rotates, a screw-threaded bore in said support arranged to engage with a correspondingly screw-threaded sleeve axially aligned with said arbour and maintained against axial displacement, gear mechanism for rotating said sleeve and means for rotating said roll between rotations of said tool holder.

8. In an apparatus for machining the circumferential portions of rolls of the type described, the combination of means for supporting at least one roll to be machined, a hollow arbour rotatable about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, a pin carried by said second rack and extending through diametrically opposed slots formed axially therein, a cage arranged exteriorly of said arbour and movable axially thereof, means for rotating said cage with said arbour, an operative connection between said pin and said cage, a ring member arranged to surround said arbour and at least a pair of cams diametrically disposed with respect to said arbour, said ring and said cams being operable to engage with said cage and effect movement thereof in one direction axially of said arbour as the same rotates, means operable to effect movement of said cage in the other direction, a support for the said ring and said cams, and means operatively connected to said support operable to move the same in both directions about the axis of said arbour as the arbour rotates, for the purpose described.

9. In an apparatus for machining the circumferential portions of rolls of the type described, the combination of means for supporting at least one roll to be machined, a hollow arbour rotatable about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, a pin carried by said second rack and extending through diametrically opposed slots formed axially in said arbour, a cage arranged exteriorly of said arbour and movable axially thereof, means for rotating said cage with said arbour, an operative connection between said pin and said cage, a ring member arranged to surround said arbour and carried by a supporting member, means operable to rotate said support in both directions about the axis of said arbour as the arbour rotates, at least a pair of segmental cams diametrically disposed with respect to said arbour and pivotally mounted at their ends to said ring supporting member, means for rocking said cams about their pivots in the axial direction of said arbour, said ring and said cams being operable to engage with said cage and effect movement thereof in one direction axially of said arbour as the same rotates, and means operable to effect movement of said cage in the other direction.

10. In an apparatus for machining the circumferential portions of rolls of the type described, the combination of means for supporting at least one roll to be machined, a hollow arbour rotatable about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour arranged in mesh with a gear wheel rotatably mounted in said arbour, a second rack disposed axially of said arbour and arranged in mesh with said gear wheel, an operative connection between said second rack and a cage arranged exteriorly of said arbour and movable axially thereof, means for rotating said cage with said arbour, a ring member arranged to surround said arbour and carried by a supporting member, means operable to rotate said supporting member in both directions about the axis of said arbour, at least a pair of segmental cams diametrically disposed with respect to said arbour and pivotally mounted at their ends to said ring supporting member, means for rocking said cams about their pivots in the axial direction of said arbour, said ring and said cams being operable to engage with said cage and effect movement thereof in one direction axially of said arbour, means operable to effect movement of said cage in the other direction, a screw-threaded bore in said ring supporting member arranged in engagement with a corresponding screw-threaded sleeve maintained against axial displacement, gear mechanism for rotating said sleeve and an operative connection between said mechanism and said means for moving the aforesaid supporting member.

11. In an apparatus for machining the circumferential portions of rolls of the type described, the combination of means for supporting at least one roll to be machined, an arbour rotatably mounted about an axis disposed transversely to the axis of a roll so supported, means for rotating said arbour, a tool holder operatively connected to said arbour so as to rotate therewith and movable radially thereon with respect to the axis of rotation of said arbour, mechanism operatively connected to said tool holder for controlling said radial movements thereof as the same rotates, an operative connection between said mechanism and a cage rotatable with and movable axially with respect to said arbour, a ring member arranged to surround said arbour, a rotatable supporting member for said ring, at least a pair of segmental cams diametrically disposed with respect to the said arbour and pivotally mounted at their ends to said ring supporting member, means for rocking said cams about their pivots, said ring and said cams being operable to engage with said cage and effect movement thereof in one direction axially of said arbour as the same rotates, means operable to effect movement of said cage in the other direction and thereby effect corresponding radial movements of said tool holder, a crank mechanism operatively connected to said supporting member and operable to oscillate the same about the axis of said arbour, a driving connection between said crank and said arbour, and means operatively connected to said supporting member operable to move the same axially of said arbour.

12. In an apparatus for machining the circumferential portions of rolls of the type described, the combination of two pairs of head-stocks each arranged to support a roll to be machined with the axes of the said rolls disposed parallel to one another, feed mechanism operatively connected to said head-stocks and adapted to move each pair of head-stocks towards and away from the other pair in a direction transverse to the axis of a roll supported thereby, an arbour rotatable about an axis disposed transversely to the plane extending through the axes of the rolls supported by said head-stocks, means for rotating said arbour, a tool holder located between said rolls and operatively connected to said arbour so as to rotate therewith and slidable in guides thereon radially with respect to the axis of rotation of the said arbour, mechanism operatively connected to said tool holder for effecting said radial displacements thereof including a cage rotatable with said arbour and operable to be displaced axially thereof as the same rotates by at least a pair of segmental cams diametrically disposed with respect to said arbour and pivotally mounted at their ends to a supporting member, a crank mechanism of variable radius operatively connected to said member and operable to oscillate the same about the axis of said arbour, means carried by said member operable to rock said cams about their pivots in the axial direction of said arbour and operatively connected to driving means therefor by a telescopic driving spindle for the purpose described.

13. In an apparatus for machining the circumferential portions of rolls of the type described, the combination of means for supporting at least one roll to be machined, an arbour rotatable about an axis disposed transversely to the axis of a roll supported by said means, means for rotating said arbour, a tool holder operatively connected to said arbour so as to rotate therewith and slidable in guides thereon radially with respect to the axis of rotation of said arbour, mechanism operable to effect radial displacements of said tool holder on said arbour including at least a pair of segmental cams diametrically disposed with respect to the axis of said arbour and mechanism operatively connected to said cams operable to move the same in both directions about the axis of said arbour as the same rotates for the purpose described.

14. In an apparatus for machining the circumferential portions of rolls of the type described, the combination of means for supporting at least one roll to be machined, an arbour rotatable about an axis disposed transversely to the axis of a roll supported by said means, means for rotating said arbour, a tool holder operatively connected to said arbour so as to rotate therewith and slidable in guides thereon radially with respect to the axis of rotation of said arbour, mechanism operable to effect radial displacements of said tool holder on said arbour including at least a pair of cams mounted upon a supporting member, a crank mechanism operatively connected to said supporting member and operable to oscillate said member about the axis of said arbour and an operative driving connection between said crank and said means for rotating said arbour.

15. In an apparatus for machining the circumferential portions of rolls of the type described, the combination of means for supporting at least one roll to be machined, an arbour rotatable about an axis disposed transversely to the axis of a roll supported by said means, means for rotating said arbour, a tool holder operatively connected to said arbour so as to rotate therewith and slidable in guides thereon radially with respect to the axis of rotation of said arbour, mechanism operable to effect radial displacements of said tool holder on said arbour including at least a pair of cams mounted upon a supporting member, a crank mechanism operatively connected to said supporting member and operable to oscillate said member about the axis of said arbour, means operable to vary the radius of said crank between two diametrically opposed extremes and an operative driving connection between said crank and said means for rotating said arbour.

16. In an apparatus for machining the circumferential portions of rolls of the type described, the combination of means for supporting a pair of rolls to be machined, an arbour rotatable about an axis disposed transversely to the plane extending through the axes of a pair of rolls supported by said means, means for rotating said arbour, a tool holder extending between said rolls and operatively connected to said arbour so as to rotate therewith and slidable in guides thereon radially with respect to the axis of rotation of said arbour, mechanism operable to effect radial displacements of said tool holder on said arbour including at least a pair of cams mounted upon a supporting member, a crank mechanism operatively connected to said supporting member and operable to oscillate said member about the axis of said arbour and an operative driving connection between said crank and said means for rotating said arbour, whereby the said crank is rotated at twice the speed of said arbour.

17. In an apparatus for machining the circumferential portions of rolls of the type described, the combination of means for supporting a pair of rolls to be machined, an arbour rotatable about an axis disposed transversely to the plane extending through the axes of a pair of rolls supported by said means, means for rotating said arbour, a tool holder extending between said rolls and operatively connected to said arbour so as to rotate therewith and slidable in guides thereon radially with respect to the axis of rotation of said arbour, mechanism operable to effect radial displacements of said tool holder on said arbour including at least a pair of cams movably mounted upon a supporting member, a crank mechanism operatively connected to said supporting member and operable to oscillate said member about the axis of said arbour and an operative driving connection between said crank and said means for rotating said arbour, mechanism carried by said supporting member operable to move said cams and vary the effective height thereof and an operative connection, including a telescopic driving spindle between said mechanism and driving means therefor independent of said supporting member.

In testimony whereof I have signed my name to this specification.

HANS SCHIMMEL.